(12) United States Patent
Tait et al.

(10) Patent No.: US 9,308,453 B2
(45) Date of Patent: Apr. 12, 2016

(54) ONLINE GAME SERVER ARCHITECTURE USING SHARED RENDERING

(71) Applicant: SQUARE ENIX HOLDINGS CO., LTD., Tokyo (JP)

(72) Inventors: Alex Tait, Montreal (CA); Tetsuji Iwasaki, Montreal (CA); Mitsuru Kamiyama, Tokyo (JP)

(73) Assignee: SQUARE ENIX HOLDINGS CO., LTD., Tokyo (JP)

( * ) Notice: Subject to any disclaimer, the term of this patent is extended or adjusted under 35 U.S.C. 154(b) by 251 days.

(21) Appl. No.: 14/353,949

(22) PCT Filed: Jan. 9, 2014

(86) PCT No.: PCT/JP2014/050725
§ 371 (c)(1),
(2) Date: Apr. 24, 2014

(87) PCT Pub. No.: WO2015/104847
PCT Pub. Date: Jul. 16, 2015

(65) Prior Publication Data
US 2015/0258438 A1    Sep. 17, 2015

(51) Int. Cl.
*A63F 13/355*    (2014.01)
*H04L 29/06*    (2006.01)

(52) U.S. Cl.
CPC .............. *A63F 13/355* (2014.09); *H04L 67/42* (2013.01); *A63F 2300/5533* (2013.01)

(58) Field of Classification Search
CPC ....... A63F 13/00; A63F 13/30; A63F 13/355; A63F 2300/53; A63F 2300/538; A63F 2300/66
USPC ................................................ 463/31, 34, 42
See application file for complete search history.

(56) References Cited

U.S. PATENT DOCUMENTS

| 2004/0029638 A1 | 2/2004 | Hytcheson et al. |
| 2006/0004874 A1 | 1/2006 | Hutcheson et al. |
| 2009/0054141 A1* | 2/2009 | Williams ................ A63F 13/10 463/31 |

(Continued)

FOREIGN PATENT DOCUMENTS

| GB | 2355627 | 4/2001 |
| JP | 2003-208633 | 7/2003 |

(Continued)

OTHER PUBLICATIONS

Anderson, "OnLiveSpot—The Coming Storm," Jul. 21, 2012 (taken from http://www.onlivespot.net/2012/07/the-coming-storm.html).

(Continued)

*Primary Examiner* — Allen Chan
(74) *Attorney, Agent, or Firm* — Greenblum & Bernstein, P.L.C.

(57) ABSTRACT

A server arrangement for controlling a video game viewable by game participants at a plurality of respective terminals. The server arrangement has a game engine to output graphical scenes collectively representing a virtual world with game characters, each graphical scene describing a portion of the virtual world. The server arrangement also has a shared-rendering engine for associating game participants with respective graphical scenes and for performing a shared-rendering operation on the graphical scenes to generate respective moving-image data streams, the shared-rendering operation being common for the game participants that are associated by the shared-rendering engine with the same graphical scene.

44 Claims, 4 Drawing Sheets

(56) References Cited

U.S. PATENT DOCUMENTS

2009/0305790 A1* 12/2009 Lu .................... A63F 13/12
                                                      463/42
2010/0167816 A1   7/2010 Perlman et al.
2011/0072072 A1   3/2011 Rapo
2011/0128300 A1*  6/2011 Gay .................. A63F 13/10
                                                      345/633

FOREIGN PATENT DOCUMENTS

| JP | 2012-245347 | 12/2012 |
|----|-------------|---------|
| WO | WO2009/029105 | 3/2009 |
| WO | WO2009/029110 | 3/2009 |
| WO | WO2010/144000 | 12/2010 |
| WO | 2013/153787 | 10/2013 |

OTHER PUBLICATIONS

Baricevic et al., "GameOn: An analysis and implementation of cloud gaming," Dec. 2010 (http://www.cs.ucsb.edu/~manasa/cs276.pdf).
Klionsky, "A New Architecture for Cloud Rendering and Amortized Graphics," MSc. Thesis, Carnegie Mellon University, Aug. 2011 (reports-archive.adm.cs.cmu.edu/anon/2011/CMU-CS-11-122.pdf).

* cited by examiner

ONLINE GAME SERVER ARCHITECTURE USING SHARED RENDERING

FIELD OF THE INVENTION

The invention relates to a server arrangement for controlling a video game, such as an online video game, using a shared-rendering engine. The invention also relates to a method for performing shared rendering of graphical scenes in a video game.

BACKGROUND OF THE INVENTION

Online video games are becoming increasingly popular. An online video game infrastructure uses a server arrangement that controls the video game and which is connected by a data network, such as the Internet, to multiple terminals. Game participants interact with the video game through the terminals.

The server arrangement requires significant computational resources, especially when the number of players involved in the game is large. The traditional server architecture allocates to each player the resources necessary to run the game logic and perform image rendering. In this fashion, image rendering is performed separately for each player.

An image rendering operation, especially when high image quality is desired, is computationally intensive. When hundreds, and even thousands, of players are involved, massive resources need to be allocated to satisfy those needs.

There is, therefore, a need in the industry to develop new server arrangement architectures that can perform the image rendering operation more efficiently.

SUMMARY OF THE INVENTION

As embodied and broadly described herein, the invention provides a server arrangement for controlling a video game viewable by game participants at a plurality of respective terminals. The server arrangement has a game engine to generate source graphics data that convey graphical scenes, collectively representing a virtual world with game characters, each graphical scene describing at least a portion of the virtual world. The server arrangement also has a shared-rendering engine, linking game participants with relevant graphical scenes and performing a shared-rendering operation to generate a moving-image data stream, the shared-rendering operation being common for the game participants that are linked by the shared-rendering engine to a particular graphical scene.

As embodied and broadly described herein, the invention also provides a method for performing shared-rendering of source graphics data in a video game viewable by game participants at a plurality of respective terminals. The method includes generating with a game engine source graphics data that convey graphical scenes collectively representing a virtual world with game characters, each graphical scene describing at least a portion of the virtual world. The method further includes linking game participants with respective graphical scenes and performing a shared-rendering operation to generate a moving-image data stream, the shared-rendering operation being common for game participants that are linked by the shared-rendering engine with a particular graphical scene.

DETAILED DESCRIPTION

Figure 1:
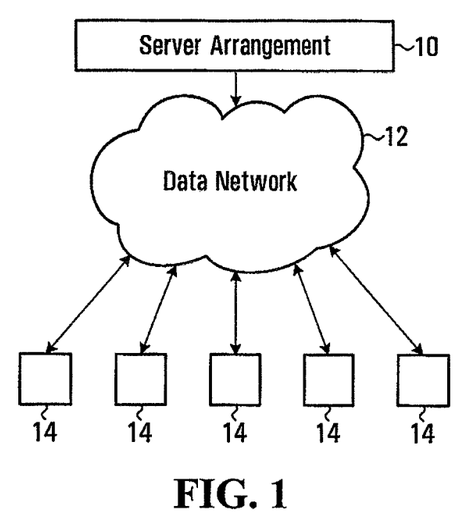
FIG. 1 is a block diagram of an online video game infrastructure.

In a specific and non-limiting example of implementation, the invention provides a server arrangement for controlling an online video game. FIG. 1 illustrates the data communication infrastructure for implementing the online video game. The infrastructure includes a server arrangement 10 that connects over a data network 12 to individual game terminals 14. The data network 12 can be the Internet.

Participants interact with the game through the terminals 14. The expression "game participant" or "participant" for short refers to a game player or to a spectator. A game player is an individual that is associated with a game character in the virtual world the game depicts. Typically, the player can control movements and other actions of the game character in order to compete with other game players or against game characters that are controlled by the game logic. A spectator on the other hand does not have a game character in the virtual world. A spectator observes the video game, over a terminal 14 that is played by game players. Note that it is also possible for a game player to spectate, although this would not typically occur at the same time. For instance, if the player dies and can re-spawn only after a predetermined amount of time has elapsed after the death event, the player might be a spectator during that idle time period. After re-spawning the individual ceases to be a spectator and takes again a player role. However, during all that time the individual continues to be a game participant.

Figure 2:
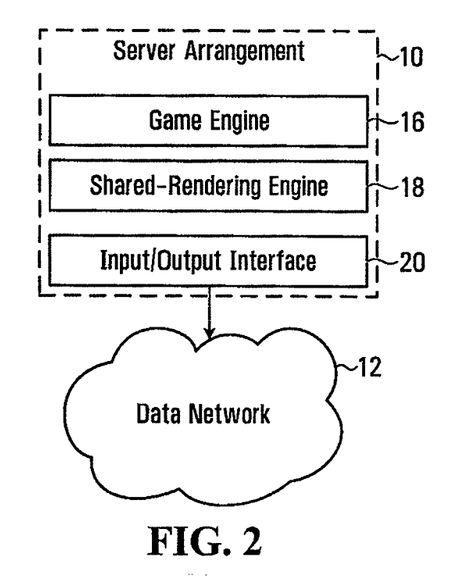
FIG. 2 is a more detailed block diagram of the server arrangement shown in FIG. 1.

The general structure of the server arrangement 10 is shown in greater detail in FIG. 2. The server arrangement 10 is essentially a computer-based platform to execute program code managing the video game and includes the necessary hardware resources to perform image rendering. At this end, the server arrangement 10 includes a machine-readable storage (not shown) in which is stored the program code and also the various parameters on which the program code operates in order to manage the game. The machine-readable storage refers to all the hardware resources for storing data and does not imply that those resources are at a single location or configured in any specific way. In most likely form of implementation, the machine-readable storage would be of distributed nature, including remote databases connected to a central unit by a communication link.

The program code stored in the machine-readable storage is executed by a single or multiple Central Processing Units (CPUs). The number of CPUs involved, their type and configuration can vary without departing from the spirit of the invention. The server arrangement 10 would also include the necessary image-rendering resources for converting the source graphics data into a moving-image data stream. Such image-rendering resources include specialized processors, such as Graphics Processing Units (GPUs) to make the operation more efficient.

From a functional perspective, the server arrangement 10 includes a game engine 16 that provides the overall game control function. The game engine 16 that collectively refers to the software elements and hardware elements necessary to embody this function, creates a dynamically evolving virtual world and controls the movements and actions of game characters in that virtual world, based on inputs provided by the game players.

The game engine 16 outputs source graphics data. The source graphics data constitutes a mathematical representation of the virtual world that is to be presented to the game participants. Since the virtual world can be extensive, the source graphics data conveys multiple graphical scenes or views that collectively provide a complete representation of the virtual world. Typically, each graphical scene is associated with a certain portion of the virtual world. Thus, different graphical scenes are essentially different views of the virtual world. As a game character moves from one location to another in the virtual world, the graphical scenes presented to that game player will change. For instance, if a game player is in a room of a dwelling and moves to an adjacent room, the graphical scene the player sees will change as the player crosses the boundary between the two rooms such as to provide the illusion of movement.

The source graphics data generated by the game engine 16 describe the virtual world of the game which is to be displayed to the player. The source graphics is the information that is supplied to the shared-rendering engine 18 and processed to generate individual pixel values expressed in terms of color and intensity, that compose the image the player is to see. Generally, the source graphics has two main components. The first is primitives data that constitutes a mathematical description of the various components of the image. An example of primitives data is vertex coordinates that define the location of the vertices making up the image mesh. Another example of primitives data is the linking of the individual vertices into geometric structures such as triangles, polygons and lines, among others.

The primitives data may also convey information such as intensity of lighting, origin of the light source, shading and texturing and also three-dimensional image information such as a relative location of the various image components in the Z direction.

In addition to the primitives data, the source graphics also includes rendering instructions. The rendering instructions are essentially commands that tell the shared-rendering engine 18 how to handle or manipulate the primitives data. An example of a rendering command, could be to create a certain visual effect or to move a certain image component in the image frame from one location to the other, cause it to rotate along a certain axis, etc.

The source graphics data is converted into a moving image data stream by the shared-rendering engine 18 in order to be displayed to the game participants. As discussed above, the rendering operation is essentially a translation of the graphical information from the mathematical space into an image, such as a 2D image, defined in terms of pixel values. The engine 18 is referred to as "shared" because at least some of the rendering operation is re-used amongst players, thus avoiding a fully independent rendering process for each player.

The shared-rendering engine 18 outputs a moving-image data stream that is sent to the respective participant terminals 14. In practice, since different players are located in different places of the virtual world, a series of moving-image data streams are generated by the shared-rendering engine 18 according to the number of players involved in the game, their viewpoint, etc.

The moving-image data stream is encoded in any suitable format for convenient decoding at the participant terminals 14. MPEG-4 is an example of an encoding format that can be used.

The output of the shared-rendering engine 18 is directed to the respective participant terminals 14 by way of the input/output interface 20. The input/output interface 20 designates the various functions of the server arrangement 10 allowing data to be sent to external devices, such as the terminals 14, or received from such external devices.

Figure 3:
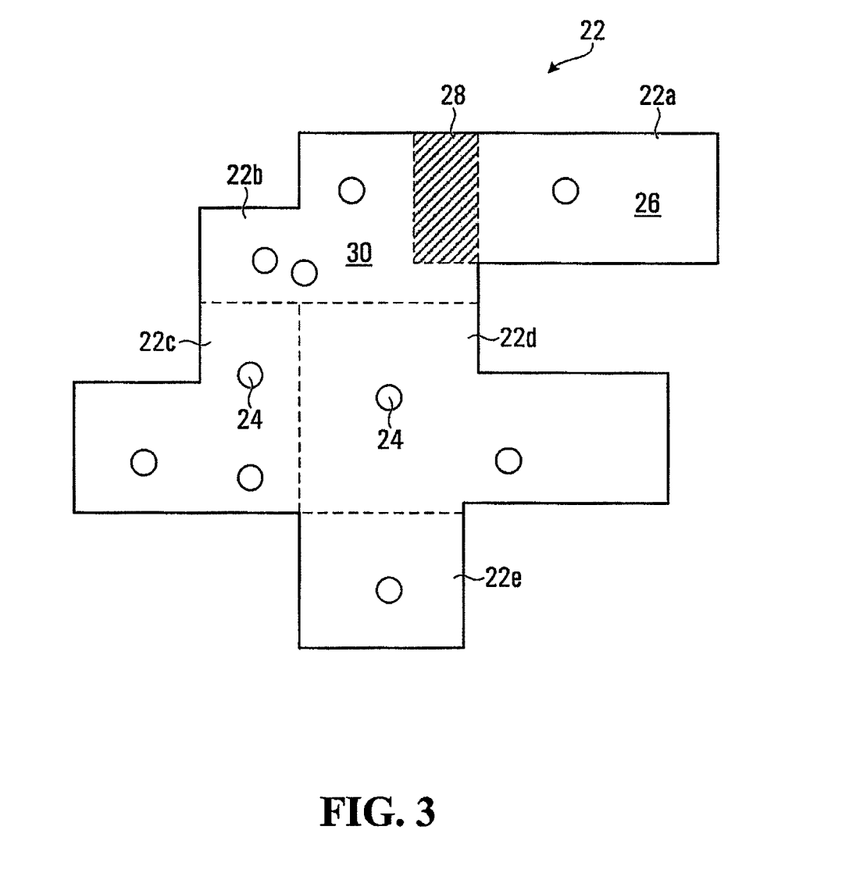
FIG. 3 shows a layout of a virtual world of an online video game, depicting various game scenes and game characters.

FIG. 3 depicts an example of a virtual world in which the online game evolves. The virtual world may represent a battlefield, a dwelling, a garden or any other venue depending on the style and type of game. The virtual world is defined by boundaries that appear to the game players as limits within which the game characters evolve. For instance, the boundaries may be depicted as walls of a dwelling.

The virtual world 22 is subdivided into smaller areas 22a, 22b, 22c, 22d and 22e. The game characters 24 remain always within the boundaries of the virtual world 22 and would typically move from one of those smaller areas to another. The areas 22a, 22b, 22c, 22d and 22e are represented by individual graphical scenes. For example, the area of the virtual world 22a is represented by a corresponding graphical scene that is rendered on the remote terminals 14 of the game players that have a game character in that area or to spectators that are interested to view the action in that area.

The way the virtual world 22 is subdivided into smaller areas that are represented by respective graphical scenes is a matter of design choice and will greatly vary from one game to another. In one example of implementation, the subdivision can be made such that the smaller areas are mutually exclusive, in other words they do not overlap. In the example shown in FIG. 3, the areas 22c, 22d and 22e do not overlap. Another possibility is to allow the smaller areas to overlap to some extent. This is the case of areas 22b and 22a. The area 22a has a first portion 26 and a second portion 28, the second portion 28 being shared with the area 22b. The area 22b also has portion 30 that is exclusive to area 22b, in other words it is not shared by any other smaller area.

The shared portion 28, which is cross-hatched in FIG. 3, represents a zone of the virtual world that can be represented by a graphical scene associated to anyone of the areas 22a and 22b. In other words, if a game character is located in zone 28, the game action can be depicted to the game player associated with that game character by rendering on the corresponding remote terminal 14 either the graphical scene that is associated with the area 22b or the graphical scene associated with the area 22a.

The logic for determining which graphical scene is rendered for a particular game player can be determined based on a number of different parameters. One such parameter is the location of the game character in the virtual world. For instance, if the game character is located in the area 22e, the graphical scene associated with that area is rendered on his/her terminal 14. So, when the game character moves around, the overall graphical scene will not change, except to reflect the game character movement, to the extent the game character remains within the boundaries of the area 22e. However, when the game character crosses the boundary and enters an adjacent area, such as the area 22d, the graphical scene rendered on the terminal 14 changes and is replaced by the one that is associated with the area 22d.

In this instance, the trigger for switching from one graphical scene to another is based on the character movement, in particular when the game character crosses the threshold between two adjacent areas of the virtual world.

A difference may arise when the game character is located in a zone that is shared by two adjacent areas, such as the portion 28 that belongs to both the area 22a and 22b. In such case, a first possible strategy is to switch graphical scenes when the game character enters into the portion 28. For instance, if the game character is within portion 30 and moves to enter the portion 28, the graphical scene is switched to the one associated with the area 22a. The other possible strategy is to switch the graphical scene only when the game character moves from the common portion 28 into a portion that is no longer shared by any other adjacent area. For instance, if the game character moves from portion 28 into portion 26, then a graphical scene switch is performed.

Alternatively, the graphical scenes may be views of the virtual world from perspectives that change based on logic other than the location of the player relative to certain coordinates in the virtual world. For example, the views may progressively shift as the game evolves. Another example is to associate a view with a certain player such that the view moves along with the player.

Figure 4:
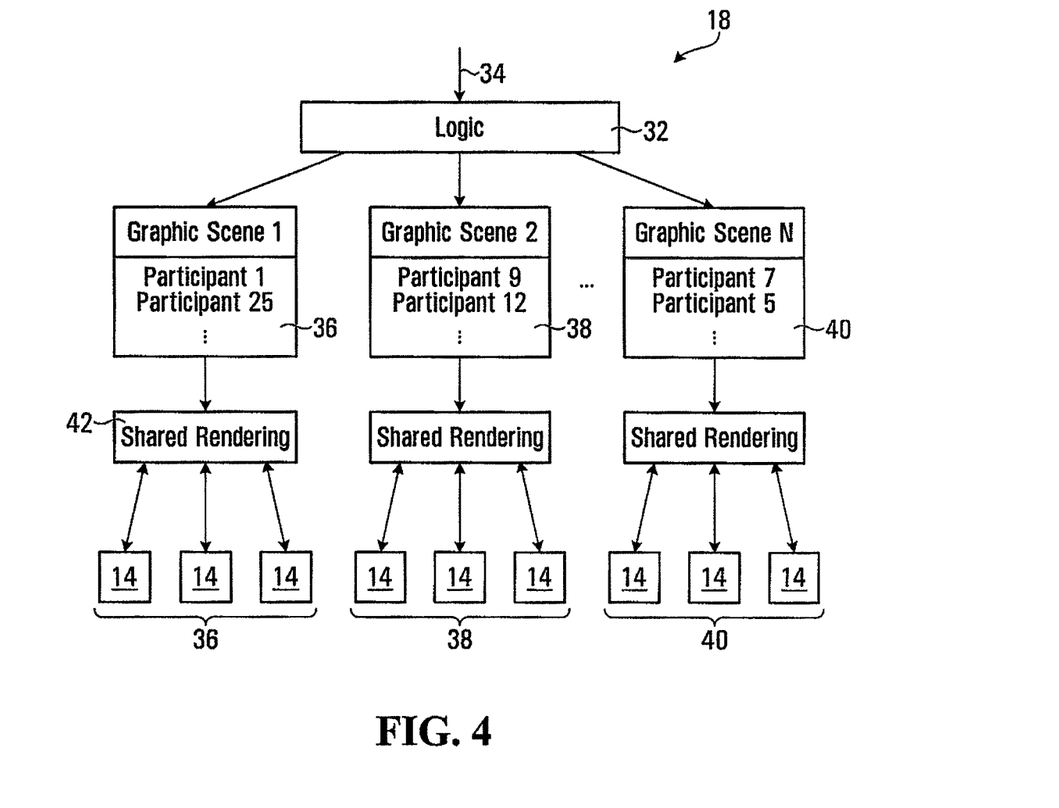
FIG. 4 is a block diagram illustrating the architecture of the shared-rendering engine used in the server arrangement shown in FIGS. 1 and 2.

FIG. 4 is a block diagram that illustrates the functions performed by the shared-rendering engine 18. The shared-rendering engine 18 has a main logic module 32 that manages the overall rendering operation. The logic module 32 receives by way of input 34 information about game parameters on the basis of which the logic 32 will associate game participants with corresponding graphical scenes or views.

This operation is performed by maintaining in the machine-readable storage of the server arrangement 10 a series of lists linking game participants to graphical scenes. In a specific example of implementation, there are as many lists as graphical scenes. In FIG. 4, N graphical scenes are shown. List 36 is associated with graphical scene 1, list 38 is associated with graphical scene 2 and list 40 is associated with graphical scene N.

Each list holds the identifiers of the participants that will receive the moving-image data stream generated on the basis of the corresponding graphical scene. The participants are those for whom the graphical scene is relevant, such as game players that have game characters appearing in the graphical scene or spectators that have selected to watch the game action in that graphical scene.

The identifier of a participant can be any piece of data that uniquely identifies the participant. The identifier can thus be associated with the participant itself, such as the IP address of the terminal 14 on which the participant interacts with the game and the identifier of the virtual character associated with the participant, among others.

The logic 32 dynamically associates participants with graphical scenes and arranges the lists 36, 38 and 40, accordingly. The dynamic association is performed by analyzing the game parameters that are received by way of the input 34.

A first possible parameter is a virtual world map which is a representation of the virtual world 22, defining a structured layout in which the areas corresponding to the various graphical scenes can be set. Typically, the first parameter will not change during the game as in most type of games, the virtual world remains the same as the game unfolds.

However, it is possible to provide a game where the virtual world can change based on action dynamics. In such case, the parameters received by way of the input 34 will reflect this change.

A second possible parameter is the location of the game characters in the virtual world 22. The location information allows the logic 32 to determine in which area of the virtual world 22 the various game characters reside and associate the game characters with the respective graphical scenes. For example, if a particular game character is located in an area corresponding to graphical scene 1, then the identifier of the participant associated with that game character is loaded in the list 36. The same operation is performed for each game character such that each game character is associated with a graphical scene.

The association between game characters and graphical scenes is dynamic in nature and changes according to the game action dynamics. As the game characters move within the virtual world 22, the logic 32 changes the association between a particular game participant and a graphical scene when the game character associated with that participant moves in an area of the virtual world 22 that corresponds to a different graphical scene. In practical terms, such change of association implies that the identifier of the game participant will be removed from one list and placed in a different list.

Yet another parameter that can be used for determining the association between participants and graphical scenes, is viewing preferences supplied by the participant itself. Viewing preferences include information provided by the participant specifying certain viewing options allowed by the system. Spectators, by the nature of their interaction with the game, would have more viewing options than game players. Since a game player controls a virtual game character, the graphical scene that the game player would see on its terminal 14 would normally be the one in which the game character is found. Spectators, on the other hand, are not tied to a particular game character and have more freedom to choose what part of the action they can view.

In the case of a spectator, the viewing preferences can include a selection of a particular game character to track. This means that the spectator will see the graphical scenes in which the selected game character is located. As a practical matter, the spectator will be paired with the game player associated with that particular game character and will be placed in the same list as the game player.

Another possible viewing preference for a spectator is a selection of a particular graphical scene. The spectator can select a graphical scene among the set of available graphical scenes and the logic 32 will place the spectator in the list of game participants that are associated with that particular graphical scene.

Yet another possible viewing preference the spectator may specify is to see graphical scenes based on action dynamics. In the case of a war game, the spectator may want to see the graphical scenes that contain most of the action. The action can be defined by a number of game characters being killed per unit of time, numbers of explosions per unit of time, rate of ordnance expenditure per unit of time and number of game characters per unit area into the virtual world 22, among others.

All of the parameters specified above exist in the game engine 16 since they constitute metrics on the basis of which the game is being managed. Those parameters are passed to the logic 32 that will process them in conjunction with the viewing preference information supplied by the game participant to determine which graphical scene meets the game participant requirements. Once the desired graphical scene is identified by the logic 32, the game participant is linked to that graphical scene.

In the case of game players, the viewing preferences may include options that become effective for game events during which the game character is temporary inactive. An example is a situation when the game character has died and will re-spawn only when a predetermined amount of time has elapsed or when the game round terminates. This is the case of game rounds which are based on elimination, where once a game character dies, it does not return in the game. When a game character becomes inactive, the game participant is effectively a spectator and has broader options in terms of viewing preferences, such as to continue watching another game participant, remain in a particular location of the virtual world 22 or watch a location selected on the basis of action dynamics.

The reader will appreciate that the examples of viewing preferences discussed above are not exhaustive and many other viewing options are possible, both for a spectator and for a game player, without departing from the spirit of the invention.

The viewing preferences for a spectator and for a game player are input at the respective terminals 14. This input operation is enabled by creating on the respective terminals 14 a Graphical User Interface (GUI) that displays to the game participant the various viewing options available and provides tools for the game participant to make the appropriate selection.

The GUI is generated by the server arrangement 10 and sent to the respective terminals 14 to be displayed. An example of a graphical user interface allowing a spectator to track or tag along a particular game character is to provide on the terminal 14 of the spectator display a list of the game characters currently involved in the game, such that the spectator can make a selection. The selection can be made by using a pointing device. When the number of game characters in the game is large, which makes it impractical to list them all, the graphical user interface can be designed to allow the spectator to select a game character while the spectator is watching the game. For instance, the spectator uses a pointing device to specify a game character displayed on a terminal while the game action is underway.

In selecting a particular graphical scene to watch, the GUI displays to the game participant a map of the virtual world, which identifies the available graphical scenes. The game participant can then select a graphical scene among those presented. For instance, the view presented to the participant can be similar to what FIG. 3 depicts. In that figure, the virtual world is shown and the boundaries of the various graphical scenes are also presented. The participant selects the graphical scene by "clicking" with the pointing device anywhere in the scene boundary.

When the viewing preferences are based on action dynamics, the GUI displays to the game participant the list of action dynamics available for selection.

The GUI that receives the input of the game participant will send information back to the server arrangement 10 which will then be processed by the logic 32 to link the game participant with the appropriate graphical scene.

A shared-rendering operation is performed for each graphical scene. The shared-rendering operation is common to the game participants in the dynamic list associated with that graphical scene. In a specific example of implementation, a single rendering operation is performed for the graphical scene and the results of that shared-rendering operation are sent to each participant in the list of participants linked with that particular graphical scene. Taking the example of graphical scene 1, the shared-rendering operation 42 is performed only once and the results of the rendering operation are sent to the terminals 14 of the game participants in the list 36.

The same operation is performed for all the graphical scenes to be rendered.

The rendering engine used to perform the rendering operation is not critical as long as it can adequately convert the source graphics data representing the different graphical scenes into a moving-image data stream. Since the rendering operation needs to be performed in real time, a hardware accelerator using dedicated GPU's would be beneficial.

Note that the expression "shared rendering" does not imply that all the image elements in the graphical scene model are necessarily rendered. The expression simply means that the majority of the image elements in the graphical scene are rendered and shared among the various participants linked to that graphical scene, but not necessarily all of them.

The shared rendering can thus be a partial rendering operation, performing rendering on a number of image elements in the graphical scene, but not necessarily all of them. The image elements which are not rendered can be rendered in a subsequent operation by the server arrangement 10 or the rendering operation can be completed at the terminal 14 location.

The output of the shared-rendering operation is a moving-image data stream that is sent to the terminals 14 for display to the game participants. The moving-image data stream is encoded under any suitable format, such as the MPEG-4 format and played at the participant terminals 14. When the shared-rendering operation is partial, leaving some of the image elements in a graphical scene not rendered, for rendering at the participant terminal 14, those objects would need to be suitably encoded for transmission and subsequent processing by a rendering module at the respective terminals 14.

Figure 5:
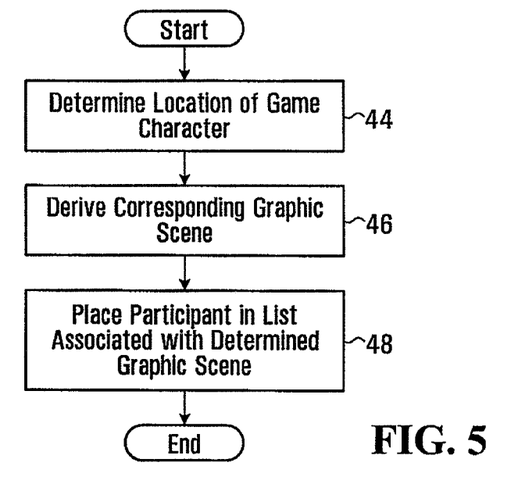
FIG. 5 is a flowchart of a process implemented by the shared-rendering engine for determining an association between a game participant and a graphical scene.

FIG. 5 is a flowchart that summarizes the above-described process implemented by the logic module 32 for linking participants with graphical scenes. This process is mostly suitable for game players that control a virtual game character. At step 44, the logic 32 determines the location of the game character associated with a particular game player in the virtual world. It is to be understood that this process is repeated constantly, allowing to continuously track the position of the game character in order to send to the game player the correct graphical scene that contains its game character. At step 46, the corresponding graphical scene is derived on the basis of the location information determined in the previous step. Finally, at step 48, the game player is linked with that graphical scene by entering its identifier in the list associated therewith.

Figure 6:
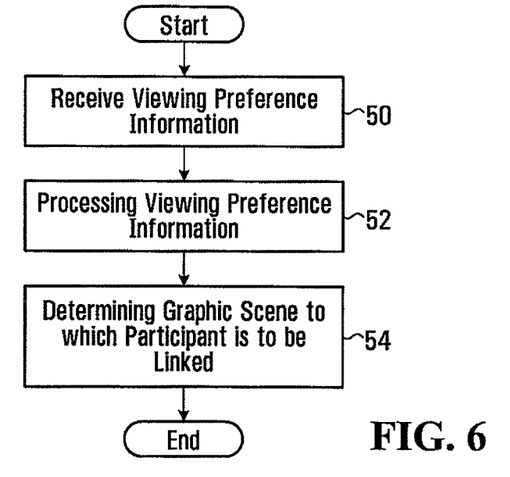
FIG. 6 is a flowchart of yet another process implemented by the shared-rendering engine for determining the association between a game participant and a graphical scene, by taking into account viewing preferences.

FIG. 6 is a flowchart summarizing the process described earlier that factors in viewing preferences in selecting the graphical scene to which the game participant is to be linked.

At step 50, the logic 32 retrieves the viewing preference information input by the game participant. This information is entered at the respective terminal 14 and it is sent back to the server arrangement 10. At step 52, the viewing preference information is processed and at step 54, the graphical scene that matches the viewing preference information is identified. Note that in addition to the viewing preference information, other parameters can be used to determine the graphical scene with which the participant should be linked. For example, the determination can take into account, in addition to the viewing preference information, location information of a game character in the virtual world.

The reader skilled in the art will appreciate that additional factors can also be taken into account in performing the graphical scene selection.

The invention claimed is:

1. A server arrangement for controlling a video game viewable by game participants at a plurality of respective terminals in communication with the server arrangement, the server arrangement comprising:
   (a) a game engine to generate source graphics data conveying a plurality of graphical scenes, the graphical scenes collectively representing a virtual world with game characters, each graphical scene describing at least a portion of the virtual world;
   (b) a shared-rendering engine for:
      (i) associating game participants with respective graphical scenes;
      (ii) performing a shared-rendering operation on a first graphical scene to generate a moving-image data stream, the shared-rendering operation being common for game participants that are associated by the shared-rendering engine with the first graphical scene;
   (c) an output for transmitting the moving-image data stream to the game terminals of the game participants associated with the first graphical scene.

2. A server arrangement as defined in claim 1, wherein the game participants include game players associated with respective game characters.

3. A server arrangement as defined in claim 1, wherein the game participants include spectators.

4. A server arrangement as defined in claim 2, wherein the shared-rendering engine associates game players with respective graphical scenes at least in part on a basis of location of game characters of the game players in the virtual world.

5. A server arrangement as defined in claim 2, wherein the shared-rendering engine associates a game player to a particular graphical scene when a game character associated with the game player appears in the portion of the virtual world described by the particular graphical scene.

6. A server arrangement as defined in claim 2, wherein the shared-rendering engine maintains in a machine-readable storage, a dynamically updated list associating game players with graphical scenes.

7. A server arrangement as defined in claim 6, wherein the shared-rendering engine is responsive to movement of a game character from a location in the virtual world represented by a first graphical scene to a different location in the virtual world represented by a second graphical scene to disassociate the game player associated with the game character from the first graphical scene and associate the game player associated with the game character with the second graphical scene.

8. A server arrangement as defined in claim 2, wherein the graphical scenes represent mutually exclusive portions of the virtual world.

9. A server arrangement as defined in claim 2, wherein two or more of the graphical scenes represent respective portions of the virtual world that partially overlap.

10. A server arrangement as defined in claim 7, wherein:
   (b) the first graphical scene has a first portion that is not shared with the second graphical scene and a second portion that is shared with the second graphical scene;
   (c) the second graphical scene has a third portion that is not shared with the first graphical scene;
   (d) the shared-rendering engine is responsive to movement of a game character from the first portion to the second portion to disassociate the game player associated with the game character from the first graphical scene and associate the game player associated with the game character with the second graphical scene.

11. A server arrangement as defined in claim 7, wherein:
   (a) the first graphical scene has a first portion that is not shared with the second graphical scene and a second portion that is shared with the second graphical scene;
   (b) the second graphical scene has a third portion that is not shared with the first graphical scene;
   (c) the shared-rendering logic maintaining the game player associated with the game character associated with the first graphical scene when the game character moves from the first portion to the second portion.

12. A server arrangement as defined in claim 3, wherein the virtual world has no characters associated with spectators.

13. A server arrangement as defined in claim 3, wherein the server arrangement has an input for receiving viewing preference information input at a terminal associated with a spectator, the shared-rendering engine associating the spectator with a graphical scene at least in part on a basis of the viewing preference information.

14. A server arrangement as defined in claim 13, wherein the viewing preference identifies a particular game character in the virtual world, the shared-rendering engine associating the spectator with the graphical scenes to which the game player associated with the game character is associated.

15. A server arrangement as defined in claim 13, wherein the viewing preference information identifies a particular location in the virtual world, the shared-rendering engine associating the spectator with a graphical scene providing a view of the particular location.

16. A server arrangement as defined in claim 13, wherein the viewing preference information describes game action parameters, the shared-rendering engine associating the spectator to a graphical scene that contains action parameters matching the viewing preference information.

17. A server arrangement as defined in claim 16, wherein the shared-rendering engine includes logic for comparing the game action parameters described in the viewing preference information of the spectator to game action parameters developing as the online game is played to determine which graphical scene contains game action parameters that match the game action parameters in the viewing preference information of the spectator, and associating the spectator to the graphical scene so determined.

18. A server arrangement as defined in claim 17, wherein the game action parameters for a particular graphical scene are selected in the group consisting of a number of game characters killed in the particular scene per unit of time, rate of ordnance expenditure per unit of time, number of explosions in the particular scene per unit of time and number of game characters present in a particular scene.

19. A server arrangement as defined in claim 13, wherein the server arrangement is configured for generating on a terminal associated with a spectator a Graphical User Interface (GUI) at which the spectator can enter viewing preference information.

20. A server arrangement as defined in claim 19, wherein the GUI presents a plurality of game characters in the virtual world allowing the spectator to select a game character among the plurality of game characters, in response to selection of a game character the GUI generating viewing preference information identifying the selected game character for transmission to the input of the server arrangement.

21. A server arrangement as defined in claim 19, wherein the GUI presents a plurality of locations in the virtual world allowing the spectator to select a location among the plurality of locations, in response to selection of a location the GUI generating viewing preference information describing the selected location for transmission to the input of the server arrangement.

22. A server arrangement as defined in claim 19, wherein the GUI presents a plurality of game action parameters allowing the spectator to select one or more game action parameters among the plurality of game action parameters, in response to selection of one or more game action parameters the GUI generating viewing preference information describing the selected game action parameters for transmission to the input of the server arrangement.

23. A method for performing shared-rendering of graphical scenes in a video game viewable by game participants at a plurality of respective terminals, the method comprising:
  (a) generating with a game engine source graphics data representing graphical scenes collectively depicting a virtual world with game characters, each graphical scene describing at least a portion of the virtual world;
  (b) associating game participants with respective graphical scenes;
  (c) performing a shared-rendering operation for a first graphical scene to generate moving-image data stream, the shared-rendering operation being common for game participants that are associated by the shared-rendering engine with the first graphical scene;
  (d) transmitting the moving-image data stream to the game terminals of the game participants associated with the first graphical scene.

24. A method as defined in claim 23, wherein the game participants include game players associated with respective game characters.

25. A method as defined in claim 23, wherein the game participants include spectators.

26. A method as defined in claim 24, including associating game players with respective graphical scenes at least in part on a basis of a location of game characters associated with the game players in the virtual world.

27. A method as defined in claim 24, including associating a game player to a particular graphical scene when the game character associated with the game player appears in a portion of the virtual world described by the particular graphical scene.

28. A method as defined in claim 24, including maintaining in a machine-readable storage a dynamically updated list associating game players with graphical scenes.

29. A method as defined in claim 28, wherein the method in response to movement of a game character from a location in the virtual world represented by a first graphical scene to a different location in the virtual world represented by a second graphical scene disassociating the game player associated with the game character from the first graphical scene and associating the game player with the second graphical scene.

30. A method as defined in claim 24, wherein the graphical scenes represent mutually exclusive portions of the virtual world.

31. A method as defined in claim 24, wherein two or more of the graphical scenes represent respective portions of the virtual world that partially overlap.

32. A method as defined in claim 29, wherein:
  (a) the first graphical scene has a first portion that is not shared with the second graphical scene and a second portion that is shared with the second graphical scene;
  (b) the second graphical scene has a third portion that is not shared with the first graphical scene;
  (c) the method disassociating the game player from the first graphical scene and associating the game player with the second graphical scene in response to movement of a game character associated with the game player from the first portion to the second portion.

33. A method as defined in claim 29, wherein:
  (a) the first graphical scene has a first portion that is not shared with the second graphical scene and a second portion that is shared with the second graphical scene;
  (b) the second graphical scene has a third portion that is not shared with the first graphical scene;
  (c) the method maintaining the game player associated with the first graphical scene when the game character moves from the first portion to the second portion.

34. A method as defined in claim 25, wherein the virtual world has no characters associated with spectators.

35. A method as defined in claim 25, including receiving viewing preference information input at a terminal associated with a spectator and associating the spectator with a graphical scene at least in part on a basis of the viewing preference information.

36. A method as defined in claim 35, wherein the viewing preference information identifies a particular game character in the virtual world, including associating the spectator with the graphical scenes to which the player associated with the particular game character is associated.

37. A method as defined in claim 35, wherein the viewing preference information identifies a particular location in the virtual world, including associating the spectator with the graphical scene depicting the particular location.

38. A method as defined in claim 35, wherein the viewing preference information describes game action parameters, the method including associating the spectator to graphical scenes that contain action parameters matching the viewing preference information.

39. A method as defined in claim 38, including comparing the game action parameters in the viewing preference information of the spectator to game action parameters developing as the game is played to determine which graphical scene contains game action parameters that match the game action parameters in the viewing preference information of the spectator, and associating the spectator to the graphical scene so determined.

40. A method as defined in claim 39, wherein the game action parameters for a particular graphical scene are selected in the group consisting of a number of game characters killed in the particular scene per unit of time, rate of ordnance expenditure, number of explosions in the particular scene per unit of time and number of game characters present in the particular scene.

41. A method as defined in claim 35, including generating a Graphical User Interface (GUI) on the terminal associated with the spectator to allow the spectator to enter viewing preference information.

42. A method as defined in claim 41, wherein the GUI presents a plurality of game characters in the virtual world allowing the spectator to select a game character among the plurality of game characters, in response to selection of a game character generating viewing preference information identifying the selected game character.

43. A method as defined in claim 41, wherein the GUI presents a plurality of locations in the virtual world allowing the spectator to select a location among the plurality of locations, in response to selection of a location generating viewing preference information describing the selected location.

44. A method as defined in claim 41, wherein the GUI presents a plurality of game action parameters allowing the spectator to select one or more game action parameters among the plurality of game action parameters, in response to selection of one or more game action parameters generating viewing preference information describing the selected game action parameters.

\* \* \* \* \*